(12) United States Patent
Maruyama et al.

(10) Patent No.: US 8,975,870 B2
(45) Date of Patent: Mar. 10, 2015

(54) CHARGING DEVICE

(75) Inventors: Tomomi Maruyama, Konosu (JP); Eiji Saiki, Konosu (JP); Akitoshi Kato, Kawasaki (JP); Yoshihiro Honda, Tokorozawa (JP)

(73) Assignees: Iwasaki Electric Co., Ltd., Tokyo (JP); Tokyo Rectifier Co., Ltd., Kawasaki-Shi (JP); JPS Co., Ltd., Tokorozawa-Shi (JP)

( * ) Notice: Subject to any disclaimer, the term of this patent is extended or adjusted under 35 U.S.C. 154(b) by 428 days.

(21) Appl. No.: 13/255,566

(22) PCT Filed: Mar. 31, 2009

(86) PCT No.: PCT/JP2009/001473
§ 371 (c)(1),
(2), (4) Date: Sep. 9, 2011

(87) PCT Pub. No.: WO2010/113206
PCT Pub. Date: Oct. 7, 2010

(65) Prior Publication Data
US 2012/0001595 A1 Jan. 5, 2012

(51) Int. Cl.
*H02J 7/00* (2006.01)
(52) U.S. Cl.
CPC .............. *H02J 7/0016* (2013.01); *Y02B 40/90* (2013.01); *H02J 7/0026* (2013.01)
USPC ........................................................ 320/118
(58) Field of Classification Search
CPC .............................. H02J 7/0016; H02J 7/0018
USPC ........................................................ 320/118
See application file for complete search history.

(56) References Cited

U.S. PATENT DOCUMENTS

| | | | |
|---|---|---|---|
| 5,274,272 A * | 12/1993 | Schwarzinger | 327/543 |
| 5,677,613 A | 10/1997 | Perelle | |
| 6,437,539 B2 * | 8/2002 | Olsson et al. | 320/118 |
| 2004/0164706 A1 * | 8/2004 | Osborne | 320/116 |
| 2004/0174150 A1 * | 9/2004 | Zhang et al. | 323/274 |

(Continued)

FOREIGN PATENT DOCUMENTS

| | | |
|---|---|---|
| JP | 63-180868 A | 7/1988 |
| JP | 05-033646 | 4/1993 |

(Continued)

OTHER PUBLICATIONS

Translation of International Preliminary Report on Patentability issued Nov. 15, 2011 and Written Opinion dated May 19, 2009 for the corresponding PCT application No. PCT/JP2009/001473.

(Continued)

*Primary Examiner* — Samuel Berhanu
*Assistant Examiner* — Jerry D Robbins
(74) *Attorney, Agent, or Firm* — Leason Ellis LLP

(57) ABSTRACT

A charging device supplies charge current to a battery group having plural secondary batteries connected in series to perform charging. In the charging device, a discharge route circuit for discharging charge current to be supplied to the secondary battery when the battery voltage of the secondary battery exceeds a predetermined voltage while charging is provided to every secondary battery. Also provided is a cutoff circuit for cutting off the discharge route circuit from each secondary battery after charging is completed. Discharge at a discharge route circuit is suppressed and energy efficiency is increased.

5 Claims, 4 Drawing Sheets

(56) References Cited

U.S. PATENT DOCUMENTS

| | | | |
|---|---|---|---|
| 2004/0251874 A1* | 12/2004 | Petitdidier | 320/118 |
| 2005/0127873 A1* | 6/2005 | Yamamoto et al. | 320/116 |
| 2006/0103351 A1* | 5/2006 | Tanigawa et al. | 320/118 |
| 2006/0139004 A1 | 6/2006 | Uesugi et al. | |
| 2007/0285058 A1* | 12/2007 | Kuroda | 320/118 |
| 2009/0261782 A1 | 10/2009 | Morita | |

FOREIGN PATENT DOCUMENTS

| | | |
|---|---|---|
| JP | 07-3251 | 1/1995 |
| JP | 07-264780 A | 10/1995 |
| JP | 08-140278 A | 5/1996 |
| JP | 10-050352 | 2/1998 |
| JP | 2000-193694 A | 7/2000 |
| JP | 2005-176520 A | 6/2005 |
| JP | 2007-244142 A | 9/2007 |
| JP | 2007-318950 A | 12/2007 |
| KR | 10-2005-0054765 | 6/2005 |
| WO | WO-2008/015933 A | 2/2008 |

OTHER PUBLICATIONS

International Search Report mailed May 19, 2009 for the corresponding PCT patent application No. PCT/JP2009/001473.

Office Action mailed Jul. 16, 2013 for the corresponding Japanese Patent Application No. 2011-506839.

Office Action dated May 15, 2013 for the corresponding Chinese Patent Application No. 200980158409.3.

Office Action mailed Jan. 6, 2014 for the corresponding Chinese Application No. 200980158409.3.

Office Action mailed Feb. 18, 2014 for the corresponding Japanese Application No. 2011-506839.

European Search Report mailed Aug. 7, 2014 for the corresponding European Application No. 09842564.

Office Action mailed Jun. 3, 2014 for the corresponding Japanese Application No. 2011-506839.

Office Action mailed Jun. 23, 2014 for the corresponding Chinese Application No. 200980158409.3.

* cited by examiner

US 8,975,870 B2

CHARGING DEVICE

CROSS-REFERENCE TO RELATED PATENT APPLICATIONS

This application is a U.S. National Phase Application under 35 U.S.C. §371 of International Application No. PCT/JP2009/001473, filed Mar. 31, 2009, which is incorporated by reference herein. The International Application was published in Japanese on Oct. 7, 2010 as International Publication No. WO/2010/113206 under PCT Article 21(2).

FIELD OF THE INVENTION

The present invention relates to a charging device for a secondary battery.

BACKGROUND OF THE INVENTION

A charging device for charging secondary batteries which are connected to one another in series in a multistage style is known.

A charging device having an overcharge protecting circuit for preventing overcharge to secondary batteries is known as the above type charging device. According to the overcharge protecting circuit, discharge route circuits each of which contains a discharge resistor are provided to the respective secondary batteries in parallel, and when overcharge of any secondary battery is detected, the secondary battery whose overcharge is detected is connected to the corresponding discharge route circuit and made to forcedly discharge, and charge current to flow into the secondary battery concerned is made to bypass the secondary battery concerned and flow into the discharge route circuit (for example, see Patent Document 1).

By providing the overcharge protecting circuit to the charging device, the following advantage is achieved in addition to the protection from the overcharge. That is, when secondary batteries which are difficult to be manufactured so that characteristics thereof such as internal resistance values under charge or the like are coincident with one another like lithium polymer batteries or the like are connected in series in a multi-stage style to charge the secondary batteries, the overcharge protecting circuit functions as a balance circuit for balancing the battery voltages of the respective secondary batteries so that the battery voltages are fitted to a fixed upper limit value. Therefore, it is possible to charge the secondary batteries with compensating dispersion in characteristic among the second batteries. Furthermore, when a secondary battery in which the battery voltage (internal resistance) under charging greatly varies due to aging degradation is charged, the upper limit value of the battery voltage is kept to a fixed value irrespective of the internal resistance of the secondary battery between the charging when use of the secondary battery is started and the charging between when aging degradation progresses to some extent, and thus the secondary battery can be charged with compensating the aging degradation.

Patent Document 1: JP-A-10-50352

SUMMARY OF THE INVENTION

Problem to be Solved by the Invention

However, when charging is completed, the charged power of each secondary battery is consumed through the discharge resistor of the discharge route circuit. The consumption of the charged power as described above makes it impossible for each secondary battery to keep a predetermined charge amount, and thus it is necessary to periodically charge each secondary battery, which causes a problem that the energy efficiency of the secondary battery is lowered.

The present invention has been implemented in view of the foregoing situation, and has an object to provide a charging device that can suppress discharge at a discharge route circuit and increase an energy efficiency.

Means of Solving the Problem

In order to attain the above object, according to the present invention, a charging device for supplying charge current to a battery group having a plurality of secondary batteries which are connected to one another in series, is characterized by comprising: a discharge route circuit that is provided to every secondary battery and discharges the charge current to be supplied to the secondary battery when a battery voltage of the secondary battery exceeds a predetermined voltage during charging; and a cut-off unit for cutting off the discharge route circuit from each secondary battery after the charging is completed.

Furthermore, according to the present invention, the above charging device further comprises a charge control unit that reduces the charge current when any secondary battery starts discharge to the discharge route circuit thereof, and continues charging until the discharge from the secondary battery to the discharge route circuit is stopped.

In order to attain the above object, according to the present invention, a charging device for supplying charge current to a battery group having a plurality of secondary batteries which are connected to one another in series, is characterized by comprising: a voltage detecting resistor for detecting a battery voltage of each secondary battery; a discharge route circuit that is provided to every secondary battery and discharges the charge current to be supplied to the secondary battery when a battery voltage of the secondary battery exceeds a predetermined voltage during charging; and a cut-off unit for cutting off the discharge route circuit from each secondary battery after the charging is completed, wherein the voltage detecting resistor has a plurality of resistance elements that are connected to one another in series, and short-circuit units each of which individually short-circuits each of the resistance elements.

According to the present invention, the above charging device further comprises a charger for supplying external power to a parallel circuit in which the battery group and an external load are connected to each other in parallel, thereby charging the battery group and supplying power to the external load, wherein under non-charging a voltage applied to the parallel circuit by the charger is controlled so that charge current flowing into the battery group is kept to be substantially zero while the battery group and the external load are kept under a conduction state.

Effect of the Invention

According to the present invention, when charging is completed, all the discharge route circuits, which are provided to every secondary battery, are cut off from the secondary batteries Therefore, after the charging is completed, the charged power is not discharged to the discharge route circuits, and thus the energy efficiency can be increased.

BRIEF DESCRIPTION OF THE DRAWINGS

These and other features and advantages of the present invention will become more readily appreciated when considered in connection with the following detailed description and appended drawings, wherein like designations denote like elements in the various views, and wherein.

Figure 1:
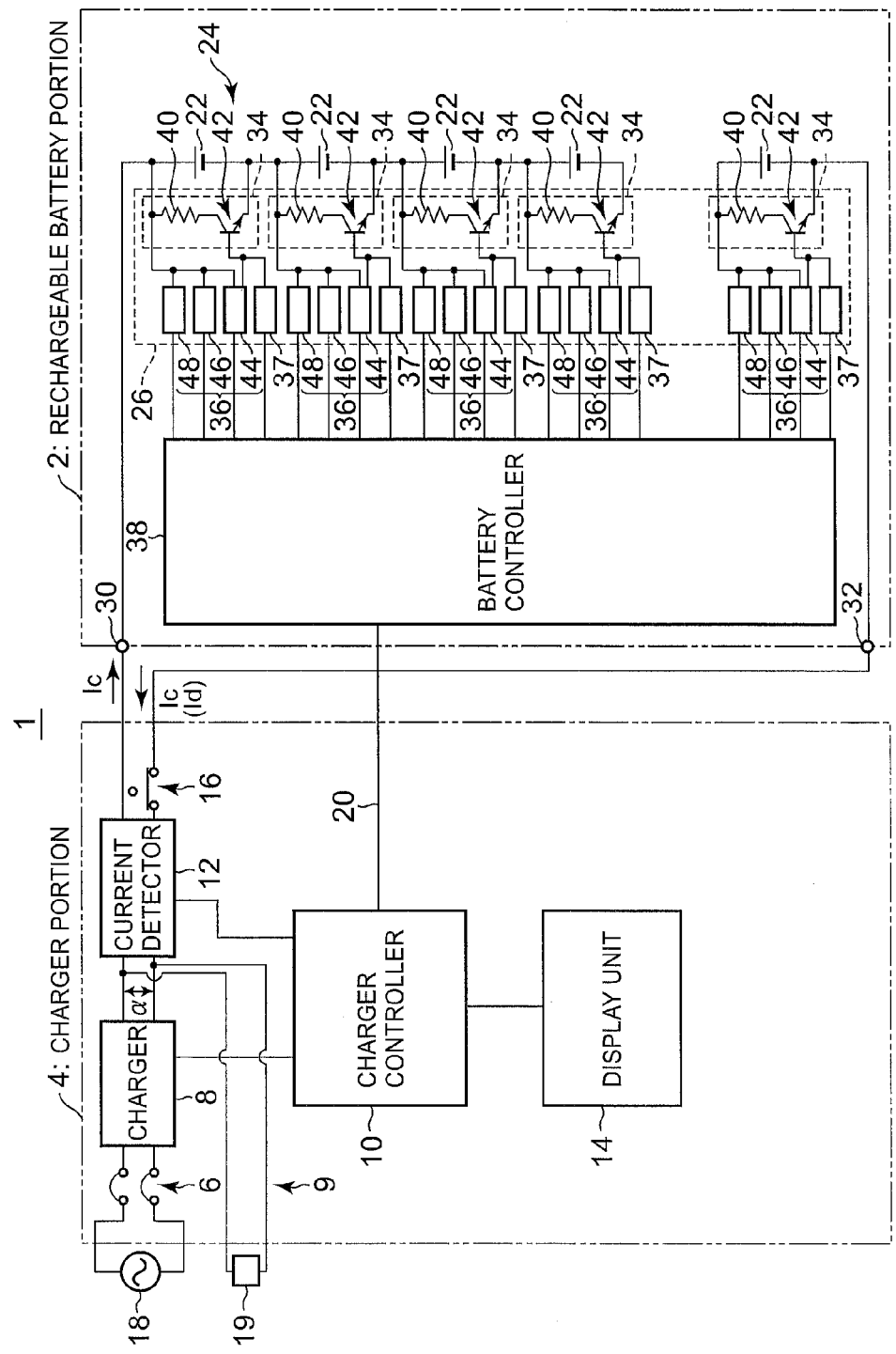
FIG. 1 is a diagram showing the construction of a charging device according to a first embodiment of the present invention.

DESCRIPTION OF REFERENCE NUMERALS 1 charging device
2 rechargeable battery portion
4 charger portion
8 charger
9 parallel circuit
10 charger controller
12 current detector
18 external power source
19 external load
22, 22A, 22B secondary battery
24 battery group
26 overcharge protecting circuit
34 discharge route circuit
37 cut-off circuit
38 battery controller
40 discharging resistor
42 switching element
61 voltage detecting resistor
63 fixed resistance element
64 short-circuit unit
Ic charge current
Vb battery voltage
Vm full charge voltage
Vth1 overcharge protection voltage

DETAILED DESCRIPTION OF THE INVENTION

Best Mode for Carrying Out the Invention

An embodiment of the present invention will be described hereunder with reference to the drawings.

FIG. 1 is a diagram showing the construction of a charging device 1 according to an embodiment. As shown in FIG. 1, the charging device 1 has a rechargeable battery portion 2 for accumulating power, and a charger portion 4 for supplying power to the rechargeable battery portion 2 to charge the rechargeable battery portion 2.

The charger portion 4 has an external power source connector 6, a charger 8, a charger controller 10, a current detector 12, a display unit 14 and a cut-off switch 16.

The external power source connector 6 is a connector to which the external power source 18 such as a commercial power source or the like, and the power of the external power source 18 is input to the charger 8.

The charger 8 supplies the power of the external power source 18 to the rechargeable battery portion 2 and an external load 19 to charge the rechargeable battery portion 2 and drive the external load 19. The external load 19 is target equipment to which the recharged power of the rechargeable battery portion 2 is supplied when the external power source 18 breaks down.

More specifically, the rechargeable battery portion 2 and the external load 19 are connected to the charger 8 in parallel, and the parallel circuit 9 is constructed by the rechargeable battery portion 2 and the external load 19. The charger 8 applies a voltage $\alpha$ to the parallel circuit 9 to supply charge current Ic as direct current to the rechargeable battery portion 2, and also supplies power to the external load 19.

When power failure occurs in the external power source 18, the charger 8 is set to a high impedance state when viewed from the parallel circuit 9 comprising the rechargeable battery portion 2 and the external load 19. Therefore, the rechargeable battery portion 2 and the external load 19 are automatically connected to each other in series, and high power is supplied from the rechargeable battery portion 2 to the external load 19.

The charger controller 10 variably controls the current value of the charge current Ic during charging, and it is connected to the rechargeable battery portion through a signal line 20. The charger controller 10 controls the charge current Ic on the basis of a signal received from the rechargeable battery portion 2 through the signal line 20.

The current detector 12 is interposed on the series circuit through which the charger 8 and the rechargeable battery portion 2 are connected to each other. The current detector 12 detects the charge current Ic directed from the rechargeable battery portion 2 to the charger 8, and outputs the charge current Ic to the charger controller 10.

The charger controller 10 variably controls the current value of the charge current Ic on the basis of a detection signal of the current detector 12.

The display unit 14 displays various kinds of information such as a charge state, etc. under the control of the charger controller 10.

The cut-off switch 16 is a normally-closed switch for stopping discharge of the rechargeable battery portion 2, and it is interposed on the series circuit through which the charger 8 and the rechargeable battery portion 2 are connected to each other. Under the control of the charger controller 10, it is opened to prevent over-discharge of the rechargeable battery portion 2 when the rechargeable battery portion 2 supplies power to the external load 19. Accordingly, the discharge caused by the power supply from the rechargeable battery portion 2 to the external load 19 or the like is stopped, and thus over-discharge is prevented.

Furthermore, the cut-off switch 16 is a normally-closed switch, and thus the rechargeable battery portion 2 and the external load 19 are normally kept to a conduction state. As described above, the rechargeable battery portion 2 and the external load 19 are normally kept to the conduction state by the switch or the like without cutting off the conduction between the rechargeable battery portion 2 and the external load 19, and thus even when power failure occurs in the external power source 18, there can be prevented such a situation that power supply to the switch concerned is stopped and thus does not actuate, so that the conduction between the rechargeable battery portion 2 and the external load 19 is kept to be cut off.

However, when the conduction state is normally kept between the rechargeable battery portion 2 and the external load 19, the charged power of the rechargeable battery portion 2 is supplied to the external load 19 under a non-charging state of the rechargeable battery portion 2. Therefore, under the non-charging state, the charging device 1 performs zero current charging to keep the charge current Ic flowing into the rechargeable battery portion 2 to substantially zero, whereby it is prevented that power is supplied from the rechargeable battery portion 2 to the external load 19 and wastefully discharged.

Specifically, under the non-charging state, the charger controller 10 subjects feedback control to the voltage $\alpha$ to be applied to the parallel circuit 9 on the basis of the detection value of the current detector 12 so that the charge current Ic flowing into the rechargeable battery portion 2 is kept to substantially zero. As a result, the differential voltages between the voltage α and the voltage of the rechargeable battery portion 2 are substantially equal to each other, and the charge current Ic flowing into the rechargeable battery portion 2 is substantially equal to zero. This state is kept, and the supply of accumulated power from the recharged battery portion 2 to the external load 19 is kept to a stop state.

Next, the construction of the rechargeable battery portion 2 will be described in detail.

The rechargeable battery portion 2 has a battery group 24 comprising secondary batteries (cells) of n (n≥2) which are connected to one another in series, and an overcharge protecting circuit (balance circuit) 26. The secondary battery 22 is a lithium polymer battery as an example of a lithium ion battery, for example. Any hermetical type secondary battery such as a nickel hydride battery, a nickel cadmium battery or the like may be used. All the secondary batteries 22 constituting the battery group 24 are constructed by the same type of secondary batteries.

The rechargeable battery portion 2 is provided with an anode terminal 30 which is electrically connected to an anode of the battery group 24, and a cathode terminal 32 which is electrically connected to a cathode of the battery group 24, and the anode terminal 30 and the cathode terminal 32 are electrically connected to the charger portion 4. Under charging, the charge current Ic is supplied from the charger portion 4 through the anode terminal 30 into the battery group 24 to charge the battery group 24.

The overcharge protecting circuit matches the voltage balance among the secondary batteries 22 to protect overcharge of the secondary batteries 22, and it has discharge route circuits 34 which are provided in parallel and each of which is provided to every secondary battery 22, a group of detectors and cut-off circuits 37 each of which is provided to every secondary battery 22, and a battery controller 38.

The discharge route circuit 34 is a circuit constructed by connecting a discharge resistor (balance resistor) 40 and a switching element 42 in series in the route. The switching element 42 is a normally-opened contact point, and it is closed when the battery voltage Vb of the secondary battery 22 reaches an overcharge protection voltage Vth1. The overcharge protection voltage Vth1 is set to a lower value (for example, a 90% value of the full charge voltage Vm) than the full charge voltage Vm corresponding to the type of the secondary battery 22. When the secondary battery 22 is a lithium polymer battery, it is set to a value which does not exceed 4.2V regarded as full charge, for example.

When the switching element 42 is closed, the discharge route circuit 34 is electrically connected to the secondary battery 22, and the secondary battery 22 starts discharge to the discharge route circuit 34. During the discharge to the discharge route circuit 34, the battery voltage Vb of the secondary battery 22 is gradually lowered because energy is discharged due to the discharge, and the charge current Ic bypasses the secondary battery 22 and flows into the discharge route circuit 34, so that the flow-in amount of the charge current Ic into the secondary battery 22 decreases. When the battery voltage Vb decreases to a protection stop voltage Vth2 which is lower than the overcharge protection voltage Vth1 by the amount corresponding to a predetermined margin, the switching element 42 is opened, and the discharge to the discharge route circuit 34 is stopped. Under charging, the secondary battery 22 is shifted to the charging state. The difference between the overcharge protection voltage Vth1 and the protection stop voltage Vth2 is set to such a value that at least chattering of the switching element 42 can be prevented.

During the discharge of the secondary cell 22, the charge current Ic to flow into the secondary battery 22 bypasses the secondary battery 22, and is introduced into the secondary battery 22 at the rear stage through the discharge route circuit 34. At this time, the bypass current value is determined on the basis of the resistance value of the discharge resistor 40.

The detector group 36 has an overcharge protection detector 44, a charge completion detector 46 and a discharge cut-off detector 48. Each of the overcharge protection detector 44, the charge completion detector 46 and the discharge cut-off detector 48 is constructed to have a comparator circuit for comparing the battery voltage Vb of the secondary battery 22 with a predetermined voltage set to each detector.

The overcharge protection detector 44 detects the battery voltage Vb of the secondary battery 22, compares the battery voltage Vb with the overcharge protection voltage Vth1, and closes the switching element 42 to make the secondary battery 22 discharge to the discharge route circuit 34 when the battery voltage Vb exceeds the overcharge protection voltage Vth1. On the other hand, when the battery voltage Vb is less than the protection stop voltage Vth2, the overcharge protection detector 44 opens the switching element 42 to stop the discharge from the secondary battery 22 to the discharge route circuit 34.

The overcharge protection detector 44 outputs an open/close signal representing an open/close state of the switching element 42, that is, start/stop of discharge to the battery controller 38 every time the switching element 42 is opened/closed. When the open/close signal is input, the battery controller 38 outputs the open/close signal to the charger controller 10 of the charger portion 4 through the signal line 20, whereby the charger controller 10 is allowed to detect discharge or non-discharge to the discharge route circuit 34.

When the charger controller 10 detects on the basis of the open/close signal during charging that any secondary battery 22 starts discharge to the discharge route circuit 34, the charger controller 10 controls to reduce the charge current Ic until the discharge to the discharge route circuit 34 is stopped, and this control will be described later.

The charge completion detector 46 detects the battery voltage Vb of the secondary battery 22, compares this battery voltage Vb with a full charge voltage Vm, and outputs a full charge completion signal to the battery controller 38 when the battery voltage Vb reaches the full charge voltage Vm. The battery controller 38 outputs a charge completion signal to the charger controller 10 through the signal line 20 when receiving the full charge completion signal from each secondary battery 22. When receiving the charge completion signal, the charger controller 10 controls a voltage α to be applied to the parallel circuit 9 containing the rechargeable battery portion 2 so that the charge current Ic flowing into the rechargeable battery portion 2 is substantially equal to zero, and stops the charging into the rechargeable battery portion 2 as the zero current charge state.

In this construction, the charging is continued until the battery voltages Vb of all the secondary batteries 22 reach the full charge voltage Vm. However, when the battery voltage Vb of any secondary battery 22 reaches a permitted voltage upper limit value (a prescribed value higher than the full charge voltage Vm), the charging of the rechargeable battery portion 2 is quickly stopped so as to prevent overcharge of the secondary batteries 22.

The discharge cut-off detector 48 detects the battery voltage Vb of the secondary battery 22 and compares the battery voltage Vb with the discharge cut-off voltage Vth3 while the accumulated power of the battery group 24 is supplied to the external load 19. When the battery voltage Vb is lower than the discharge cut-off voltage Vth3, the detection signal is output to the battery controller 38. The discharge cut-off voltage Vth3 prevents the secondary battery 22 from falling into a state that the secondary battery 22 discharges beyond a stop voltage, that is, a so-called over-discharge state, and the discharge cut-off voltage Vth3 is set to a voltage which is not lower than the stop voltage. For example, when the secondary battery 22 is a lithium polymer battery, the discharge cut-off voltage Vth3 is set to about 3V.

When the battery controller 38 receives a detection signal from any discharge cut-off detector 48, a cut-off signal representing that the discharge should be cut off is output to the charger controller 10 through the signal line 20 by the battery controller 38. The charger controller 20 opens the cut-off switch 16 when receiving the cut-off signal from the battery controller 38, whereby the discharge caused by the power supply from the rechargeable battery portion 2 to the external load 19 or the like is stopped.

The charging device 1 has a temperature detection sensor such as a thermistor or the like for detecting the battery temperature of the battery group 24, and during charge, the charging device 1 stops charging when the temperature of the battery group 24 exceeds a predetermined temperature (for example, 60° C. in the case of the lithium polymer battery).

The cut-off circuit 37 is a circuit for electrically cutting off all the discharge route circuits 34 provided to the respective secondary batteries 22 from the secondary batteries 22 when the charging to the battery group 24 is completed. Specifically, following the stop of the charging to the rechargeable battery portion 2 by the charger controller 10, the cut-off signal is input from the charger controller 10 to all the cut-off circuits 37. In response to the input of the cut-off signal, the cut-off circuit 37 opens the switching element 42 to electrically cut-off the discharge route circuit 34 from the secondary battery 22.

Here, according to this construction, the charging is controlled on the basis of the battery voltages Vb during charging so that the battery voltage Vb and the overcharge protection voltage Vth1 are compared with each other every secondary battery 22 to control the charge current Ic, and the charging is continued until the battery voltages Vb of all the secondary batteries 22 reach the full charge voltage Vm.

Accordingly, when the detection precision of the battery voltage Vb is low, variable control of the charge current Ic described later which is matched with the discharge to the discharge route circuit 34 cannot be accurately performed, and there is a case where each secondary battery 22 cannot be charged till the full charge voltage Vm. Furthermore, when the battery voltage Vb of the secondary battery 22 is under-detected, the charging is continued although the battery voltage Vb exceeds the full charge voltage Vm, and this is not preferable from the viewpoint of safety. In order to prevent charging beyond the full charge voltage Vm, the charging may be stopped on the basis of a value lower than the full charge voltage Vm. However, this causes decrease of the amount of charge to the secondary battery 22.

Therefore, according to this embodiment, this problem is solved as follows.

Figure 2:
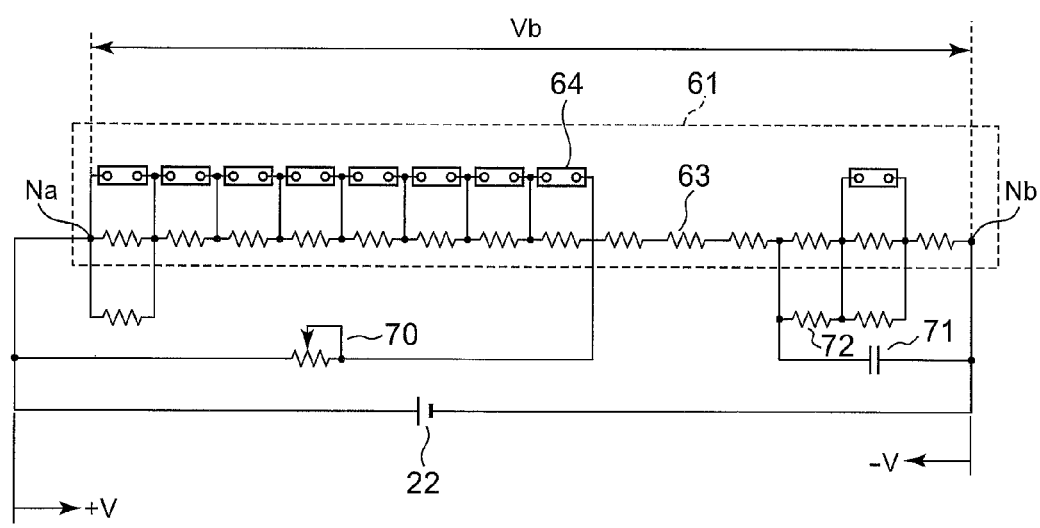
FIG. 2 is a diagram showing the construction of a voltage detecting resistor.

FIG. 2 is a diagram showing the circuit construction of a voltage detecting resistor 61 for detecting the battery voltage Vb of the secondary battery 22. As shown in FIG. 2, the voltage detecting resistor 61 is connected to the secondary battery 22 in parallel, and it comprises plural fixed resistance elements 63 (fourteen in the example of FIG. 2) which are connected to one another in series. During charging, a potential difference corresponding to the battery voltage Vb of the secondary battery 22 occurs between nodes Na and Nb at both the ends of the voltage detecting resistor 61. This potential is input to a comparator circuit of the charge completion detector 46, and compared with the full charge voltage Vm as a reference voltage.

In the voltage detecting resistor 61, each of some fixed resistance elements 63 has a short-circuit unit 64. The short-circuit unit 64 has terminals lead from both the ends of the fixed resistance element 63, and these terminals are short-circuited to each other by solder or the like, whereby the fixed resistance elements 63 can be individually short-circuited. Accordingly, in the voltage detecting resistor 61, the resistance value thereof can be adjusted by individually short-circuiting an arbitrary number of fixed resistance elements 63.

In general, the fixed resistance elements 63 are dispersed in resistance value in some degree in accordance with production lot, temperature or the like, and thus a desired resistance value cannot be obtained even when a predetermined number of fixed resistance elements 63 are connected to one another in series. However, according to this embodiment, the voltage detecting resistor 61 can be adjusted to have a desired resistance value by arbitrarily short-circuiting the short-circuit units 64. Accordingly, the battery voltage Vb of each secondary battery 22 can be accurately detected, and thus the charging can be finished under the state that the battery voltages of all the secondary batteries 22 are made accurately coincident with the full charge voltage Vm.

The variable minimum resistance value of the voltage detecting resistor 61 (the resistance value per fixed resistance element 63) is set to a resistance value with which the battery voltage Vb is adjustable by a voltage value which is equal to about one tenth of the potential difference between a permitted upper limit value as the battery voltage Vb of the secondary battery 22 and the full charge voltage Vm, whereby the battery voltage Vb is prevented from exceeding the full charge voltage Vm and reaching the upper limit value.

A variable resistor 70, a capacitor 71 and a fixed resistance element 72 are arbitrarily provided to the voltage detecting resistor 61 in parallel. Particularly, the precision can be enhanced by providing the variable resistor 70.

Next, the charge control of the charging device 1 will be described.

Figure 3:
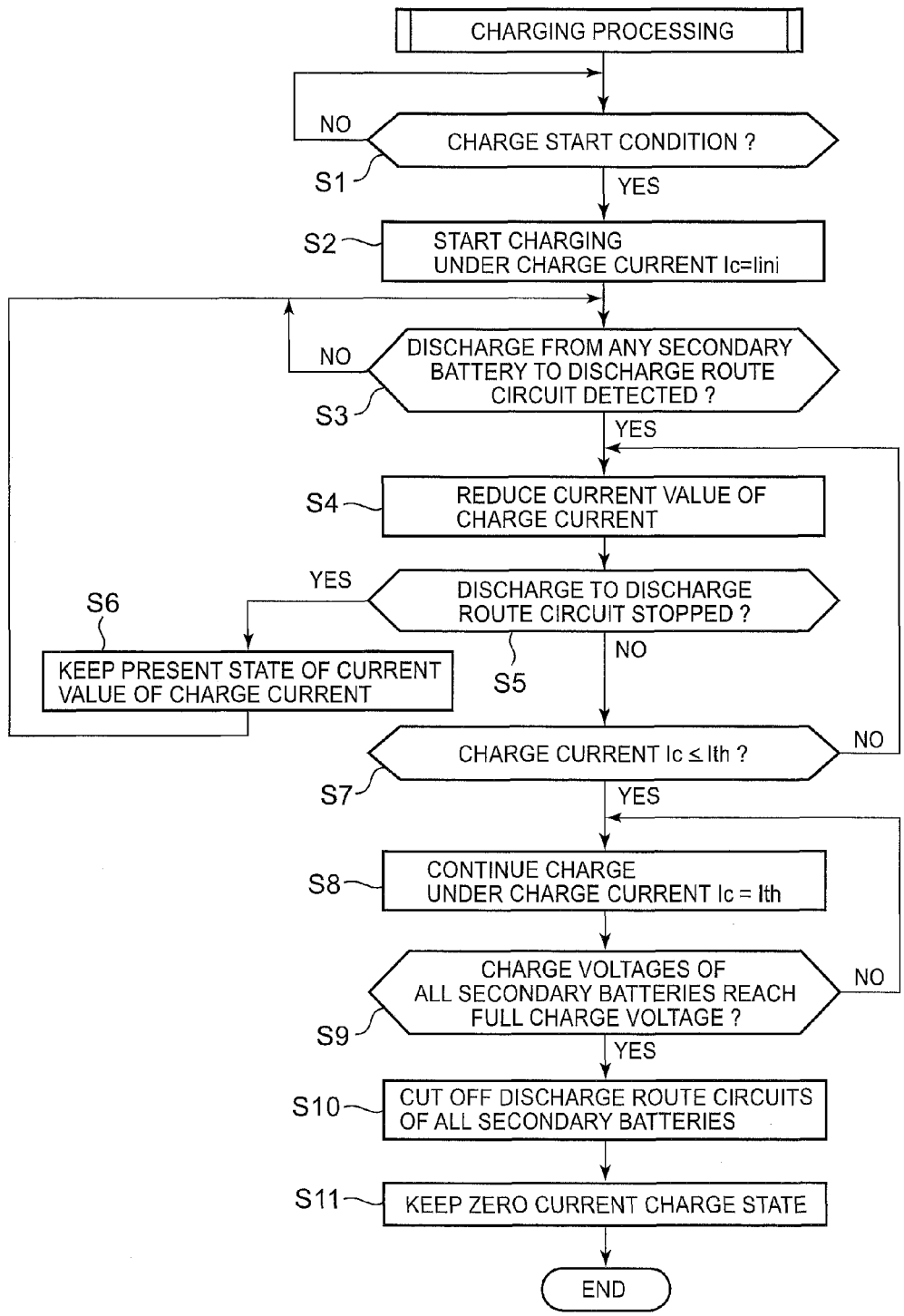
FIG. 3 is a flowchart of charging processing.
Figure 4:
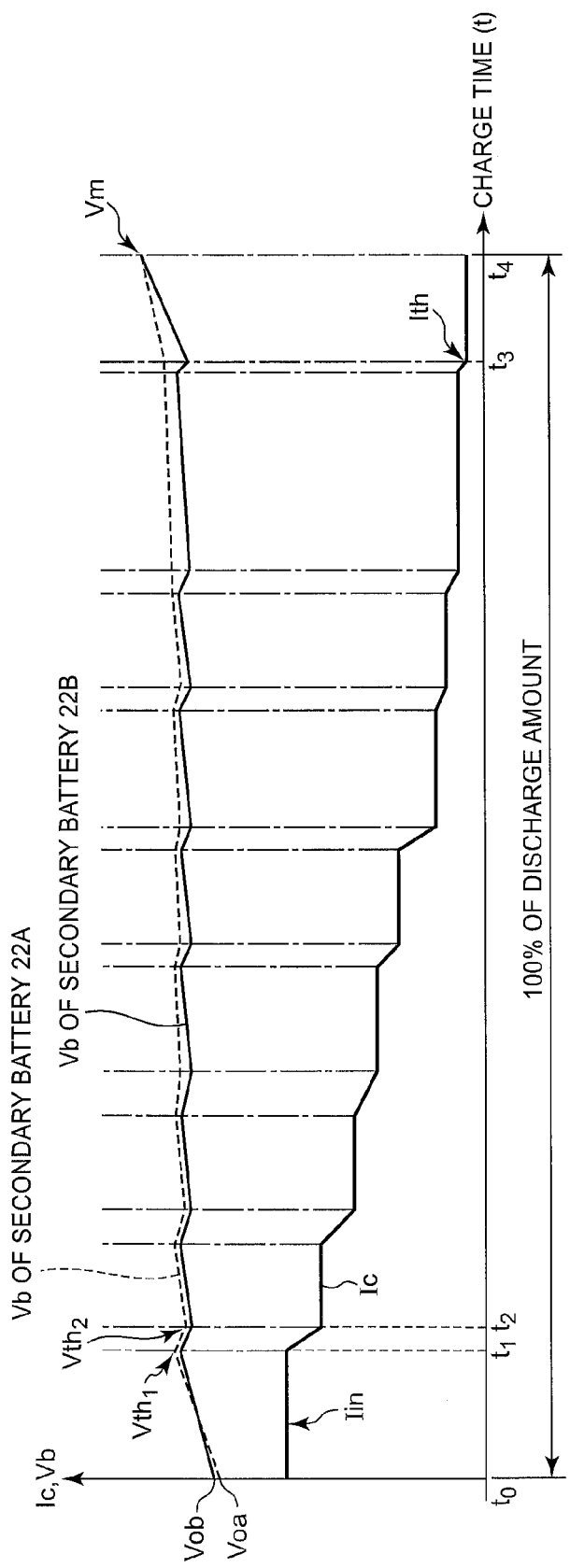
FIG. 4 is a diagram showing a charging pattern.

FIG. 3 is a flowchart showing the charging processing of the charging device 1, and FIG. 4 is a diagram showing charge patterns of the charging device 1. FIG. 4 shows charge patterns for two secondary batteries 22A and 22B having different battery voltage rising characteristics during charging.

When charging is executed, the charging device 1 determines whether a charging start condition is satisfied (step S1). As the charging start condition are set various conditions such as a condition that the battery group 24 gets out of a full charge state, a condition that the cut-off switch 16 is opened to prevent over-discharge, a condition that a fixed time period elapses from the end of the previous charging, etc.

When the charging start condition is satisfied (step S1: YES), the charging device 1 supplies the charge current Ic of a current value Iini to the rechargeable battery portion 2 to start charging (step S2). That is, the charging device 1 adjusts the voltage α to be applied to the battery group 24 so that the current value of the charge current Ic is equal to the current value Iini while sampling the detection signal of the current detector 12. As shown in FIG. 4, when the supply of the charge current Ic is started and thus the charging is started (time t0), the respective battery voltages Vb of the secondary batteries 22A and 22B of the battery group 24 start to rise from charge initial voltages V0a and V0b.

A shown in FIG. 4, when the secondary battery 22A has a characteristic that the battery voltage Vb thereof is more liable to increase than that of the secondary battery 22B, the battery voltage Vb of the secondary battery 22A reaches the overcharge protection voltage Vth1 (time t1) before the battery voltage Vb of the secondary battery 22B reaches the overcharge protection voltage Vth1. As a result, in order to prevent the overcharge to the secondary battery 22A, the overcharge protecting detector 44 of the secondary battery 22A closes the switching element 42 to connect the secondary battery 22A to the discharge route circuit 34, whereby discharge is started. When the overcharge protecting detector 44 closes the switching element 42, the open/close signal is output to the charger controller 10, whereby the discharge from the secondary battery 22A to the discharge route circuit 34 is detected by the charger controller 10.

As shown in FIG. 3, when detecting the discharge from any secondary battery 22 to the discharge route circuit 34 (step S3: YES), the charger controller 10 successively reduces the current value of the charge current Ic (step S4).

Accordingly, as shown in FIG. 4, the current value of the charge current Ic is reduced from the time t1 at which the battery voltage Vb of the secondary battery 22A reaches the overcharge protection voltage Vth1.

The battery voltage Vb of the secondary battery 22A gradually decreases in connection with the discharge to the discharge route circuit 34 and the decrease of the charge current Ic, and when it decreases to the protection stop voltage Vth2 (time t2), the overcharge protecting detector 44 of the secondary battery 22A opens the switching element 42, and stops the discharge from the secondary battery 22A to the discharge route circuit 34. The stop of the discharge to the discharge route circuit 34 is detected by the charger controller 10 on the basis of the output of the open/close signal to the charger controller 10.

As shown in FIG. 3, when detecting the stop of the discharge from the secondary battery 22 to the discharge route circuit 34 (step S5: YES), the charger controller 10 stops the reduction of the current value of the charge current Ic and fixes the current value to the present value (step S6), and returns the processing procedure to the step S3 to continue charging.

Accordingly, as shown in FIG. 4, the charge current Ic decreases until the battery voltage Vb of the secondary battery 22A decreases to the protection stop voltage Vth2, and then it is fixed to the current value when the discharge is stopped. When the charge current Ic is reduced, not only the battery voltage Vb of the secondary battery 22A, but also the battery voltage Vb of the secondary battery 22B decreases.

Subsequently, the processing of reducing the charge current Ic until the discharge from the secondary battery 22 to the discharge route circuit 34 is stopped is repetitively executed every time the discharge from any secondary battery 22 to the discharge route circuit 34 is detected. This repeat frequency is varied in accordance with the difference in voltage rising characteristic during charging of the secondary battery 22, degradation degree of the secondary battery 22 or the like, and it is not necessarily fixed to a predetermined repeat frequency.

At the charge termination stage at which each secondary battery 2 approaches to the full charge stage, as shown in FIG. 4, the charge current Ic decreases, and the charge current Ic is lower than a charge lower limit current value Ith (time t3) through the processing of the step S4 when the charge current Ic is reduced. The charge lower limit current value Ith is set to a predetermined current value read when each secondary battery approaches to the full charge state.

As shown in FIG. 3, when detecting that the charge current Ic decreases to the charge lower limit current value Ith or less (step S7: YES), the charger controller 10 continues the charging with keeping the charge current Ic to the charge lower limit current value Ith (step S8).

As a result, the charge state of each secondary battery 22 approaches to the full charge state, and there are many secondary batteries 22 in which the battery voltage exceeds the overcharge protection voltage Vth1 and the discharge to the discharge route circuit 34 starts. At this time, the charge current Ic has a very small value, and thus the bypass current value flowing into the discharge route circuit 34 is very small, so that the energy loss at the discharge resistor 40 is small. With respect to even a secondary battery 22 being bypassed, slight current which is a part of the charge current Ic and does not bypass the secondary battery 22 flows into the secondary battery 22, so that the battery voltage Vb thereof exceeds the overcharge protection voltage Vth1 and reaches the full charge voltage Vm (time t4) as shown in FIG. 4.

As described above, when the battery voltages Vb of all the secondary batteries 22 reach the full charge voltage Vm (step S9: YES), about 100% of the discharge amount is charged from the time when charge is started (time t0).

In order to prevent needless discharge through the discharge route circuit 34 after the charging is completed, the charger controller 10 inputs the cut-off signal to all the cut-off circuits 37 through the battery controller 38 to open the switching elements 42, whereby all the discharge route circuits 34 are electrically cut off from the secondary batteries 22 (step S10). The charging device 1 sets the charge state of the rechargeable battery portion 2 to the zero current charge state, and stops the charging to the rechargeable battery portion 2 (step S11).

In this zero current charging, the voltage α of the charger 8 is subjected to feedback control so that the charge current Ic flowing into the rechargeable battery portion 2 is kept to substantially zero. Accordingly, the charging state to the rechargeable battery portion 2 is set to the stop state, and the state that the supply of accumulated power from the rechargeable battery portion 2 to the external load 19 is stopped is kept while the conduction state between the rechargeable battery portion 2 and the external load 19 is kept.

The processing order of the steps S10 and S11 may be inverted.

As described above, according to this embodiment, there are provided the cut-off circuits 37 through which all the discharge route circuits provided to every secondary battery 22 are electrically cut off from the secondary batteries 22 when the charging to the battery group 24 is completed. Accordingly, even when the charging device 1 is provided with the discharge route circuits 34, the charged power is prevented from being discharged to the discharge route circuits 34 after the charging is completed, and thus the energy efficiency can be enhanced.

Particularly, according to this embodiment, when any secondary battery 22 starts discharge to the discharge route circuit 34, charging is continued while the charge current Ic is reduced until the discharge from the discharge-starting secondary battery 22 to the discharge route circuit 34 is stopped, whereby each secondary battery 22 is charged till the full charge voltage Vm. Therefore, the full charge state can be kept with suppressing discharge at the discharge route circuits 34.

Furthermore, the full charge voltage Vm is higher than the charge completion voltage set in a conventional charging device. Therefore, under the overcharge state, the current flowing into the discharge route circuit 34 is relatively high, and thus a heat generation problem occurs. On the other hand, according to this embodiment, the discharge route circuit 34 is cut off from the secondary battery 22, and such a problem does not occur.

Furthermore, according to this embodiment, the voltage detecting resistor 61 has the plural fixed resistance elements which are connected to one another in series, and the short-circuit units 64 which individually short-circuit the respective fixed resistance elements 63 are provided. Therefore, the battery voltage Vb of each secondary battery 22 can be accurately detected, and the charging can be completed while all the secondary batteries 22 are accurately and uniformly set to the full charge state.

Furthermore, according to this embodiment, the parallel circuit 9 is constructed by the battery group 24 and the external load 19, and connected to the charger 8. Therefore, the battery group 24 and the external load 19 are kept under the conduction state during the non-charging period. Therefore, when the external power source 18 supplied to the charger 8 breaks down, the battery group 24 and the external load 19 automatically constitutes a series circuit, supply of accumulated power from the battery group 24 to the external load 19 is quickly started.

Furthermore, under the non-charging period, the voltage α applied from the charger 8 to the parallel circuit 9 is controlled so as to keep the charge current Ic flowing into the battery group 24 to substantially zero. Therefore, no power is supplied from the battery group 24 to the external load 19, and needless discharge of the battery group 24 is prevented.

The above-described embodiment merely represents a mode of the present invention, and it is needless to say that any modification and application may be made without departing from the subject matter of the present invention.

The invention claimed is:

1. A charging device for supplying charge current to a battery group, thereby fully charging the battery group, said charging device comprising:
    a plurality of secondary batteries that are connected to one another in series;
    a plurality of discharge route circuits each of which is connected in parallel with a single secondary battery and contains a discharge resistor and a switching element connected in series, the switching element discharging the charge current to be supplied to the secondary battery to the discharge resistor when a battery voltage of the secondary battery exceeds a predetermined voltage that is lower than a full charge voltage during charging;
    a plurality of cut-off units;
    a charge control unit that reduces the charge current to be supplied to all of the secondary batteries when a battery voltage of any secondary battery exceeds the predetermined voltage to start discharging through the discharge route circuit thereof, and continues charging until the discharge from the secondary battery to the discharge route circuit is stopped, said secondary batteries including batteries whose voltages exceed the predetermined voltage and other batteries whose voltages do not reach the predetermined voltage; and
    a cut-off unit that opens the switching elements to cut off each discharge route circuit from each secondary battery when the battery voltages of all of the secondary batteries reach the full charge voltage.

2. The charging device according claim 1, further comprising a charger for supplying external power to a parallel circuit in which the battery group and an external load are connected to each other in parallel, thereby charging the battery group and supplying power to the external load, wherein under non-charging conditions, a voltage applied to the parallel circuit by the charger is controlled so that charge current flowing into the battery group is kept to be substantially zero while the battery group and the external load are kept under a conduction state.

3. The charging device according claim 1, further comprising a charger for supplying external power to a parallel circuit in which the battery group and an external load are connected to each other in parallel, thereby charging the battery group and supplying power to the external load, wherein under non-charging conditions, a voltage applied to the parallel circuit by the charger is controlled so that charge current flowing into the battery group is kept to be substantially zero while the battery group and the external load are kept under a conduction state.

4. The charging device according to claim 1, further comprising:
    a voltage detecting resistor that detects a battery voltage of each secondary battery and includes a plurality of resistance elements connected to one another in series; and
    short-circuit units each of which individually short-circuits each of the resistance elements.

5. The charging device according claim 4, further comprising a charger for supplying external power to a parallel circuit in which the battery group and an external load are connected to each other in parallel, thereby charging the battery group and supplying power to the external load, wherein under non-charging conditions, a voltage applied to the parallel circuit by the charger is controlled so that charge current flowing into the battery group is kept to be substantially zero while the battery group and the external load are kept under a conduction state.

* * * * *